Oct. 18, 1966  A. T. BUTTRISS  3,279,727
FASTENING DEVICE AND ASSEMBLY

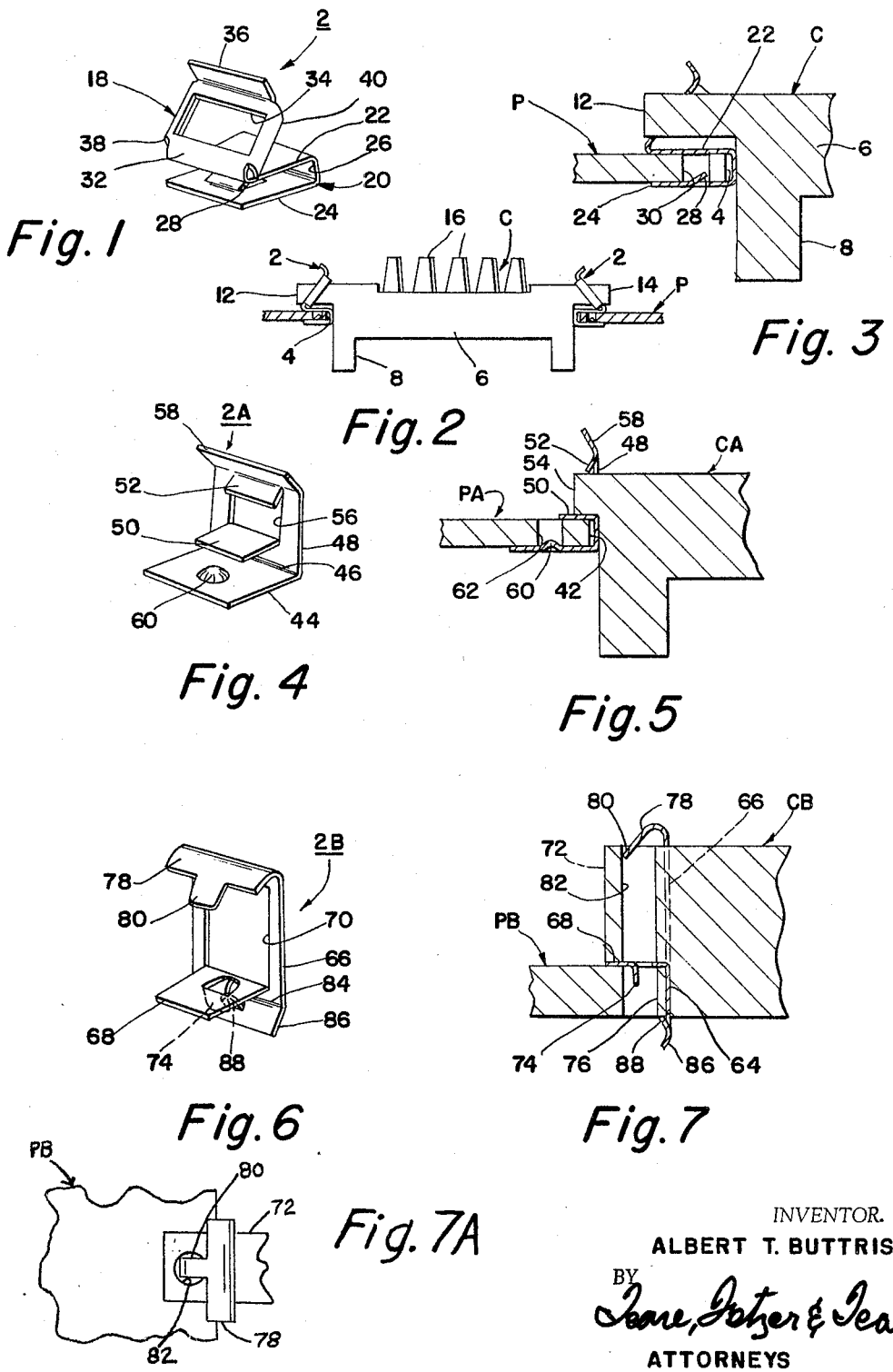

Filed Aug. 31, 1964  2 Sheets-Sheet 2

INVENTOR.
ALBERT T. BUTTRISS
BY *Jean, Fetzer & Jean*
ATTORNEYS

3,279,727
FASTENING DEVICE AND ASSEMBLY
Albert T. Buttriss, Westlake, Ohio, assignor to Tinnerman Products, Inc., a corporation of Ohio
Filed Aug. 31, 1964, Ser. No. 393,160
7 Claims. (Cl. 248—27)

This invention relates to fastening devices, and more particularly to fastening devices and an assembly for mounting an article on an apertured support member, such as a panel or the like.

More specifically, the present invention is directed to fastening devices constructed for use in mounting articles or objects, such as moldings, trim strips, inspector plates, covers, electrical elements or the like, through an opening in a support members, such as a panel, chassis, frame, modules, circuit rack or the like, for rigidly mounting the same in applied position without danger of loosening or being inadvertently removed therefrom incident to vibration, jarring and strain which may be imparted to the supporting member.

A specific illustration of the use to which the fastening devices of this invention may be applied is the mounting of an electrical element, such as a connector, for various types of electronic installations. In mounting such connectors, it is essential that the fastening device be capable of being easily and quickly applied with a firm, rigid engagement in the applied position on the support member, in order to withstand the jarring and stress and/or strain forces incident to such installation, particularly when one or more of the connectors has been removed or is missing from the installation. Furthermore, it is essential that the fastening devices be capable of being easily and quickly applied to the connector, particularly when access for positioning the fastener may be achieved principally from one side only of the device to which the connector is intended to be attached. Moreover, it is important that such attachment be readily achieved regardless of substantial tolerance variations between the parts, and without the necessity of having to use conventional type nut and bolt or rivet-type arrangements to achieve the attachment.

The present invention contemplates the provision of a fastening device for mounting an article, such as an electrical connector, on an apertured support member through the medium of a projecting portion which may form a part of the article and which may be inserted through a window-like opening construction provided in the fastener, and which will, by the act of insertion, automatically coact therewith to prevent any movement of the article relative to the panel in the installed position of the fastener.

Accordingly, an object of the present invention is to provide a fastening device which is of a relatively simple construction and which is inexpensive to produce for quickly and easily mounting an article, such as an electrical connector, to an apertured supported member.

Another object of the present invention is to provide a fastening device of the character described which may be readily attached to a support member and which includes a window-like construction through which may be inserted a projecting portion of an article, and which will, by the act of insertion, automatically coact therewith to prevent movement of the connector in mounted position on the support member.

A further object of the present invention is to provide a combination of article and fastening device by use of which the article and fastener, as a unit, may be applied through an opening in a support member and thereby achieve an automatic locking coaction between the article and support member in the installed position thereof.

Further objects and advantages of the present invention will be apparent to those skilled in the art as the description herein proceeds with reference to the accompanying drawings, in which like reference characters designate like parts throughout, and in which:

FIG. 1 is a perspective view of a fastening device made in accordance with the present invention;

FIG. 2 is a sectional view showing a pair of fastening devices of FIG. 1 in assembled position for mounting an article, such as an electrical connector, on an apertured support member;

FIG. 3 is a sectional view showing one end of an article, such as an electrical connector, mounted in an opening of a support member by means of one of the fastening devices shown in FIG. 2;

FIG. 4 is a perspective view of a modification of the fastening device made in accordance with the present invention;

FIG. 5 is a sectional view showing one end of an article, such as an electrical connector, mounted through the opening of a support member by means of the fastening device shown in FIG. 4;

FIG. 6 is a perspective view of another modification of the fastening device made in accordance with the present invention;

FIG. 7 is a sectional view showing one end of an article, such as an electrical connector, mounted through an opening in a support member by means of the fastening device shown in FIG. 6;

FIG. 7A is a top plan view of the assembly shown in FIG. 7;

Figure 8:
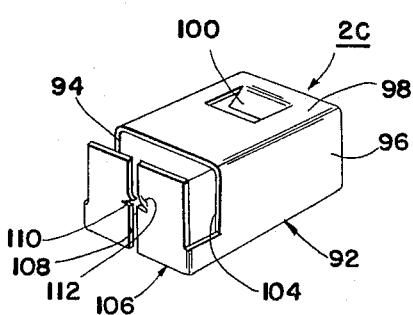
FIG. 8 is a perspective view of another modification of the fastening device made in accordance with the present invention.

Referring now again to the drawings and in particular to FIGS. 1 to 3 thereof, the fastening device, designated generally at 2, is shown in connection with a support member P, such as a panel, having an opening 4 for mounting therethrough an article C, such as an electrical connector. In the embodiment shown, the connector includes a body 6 made preferably from an electrical insulating material, such as a ceramic or polymeric material having electrical insulating characteristics. The body 6 of the connector includes a pair of spaced, vertically extending legs 8 and 10 adapted to extend through the opening 4 in the panel P, and a pair of flanged ends 12 and 14 projecting laterally outwardly from opposite sides of the body 6 adapted to overlie upper marginal portions of the panel immediately adjacent the panel opening 4. The connector C may be provided with a plurality of upstanding connecting elements 16 adapted to be connected to a conventional source of power (not shown).

It is contemplated herein that the fastening devices be made from a single piece of strip material preferably that of a spring-like nature, such as spring steel or cold rolled metal having spring-like characteristics. In the embodiment shown, the fastener 2 is preferably constructed to provide what may be termed a double-ended device comprising a yieldable arm connector engaging portion 18, and a cooperating generally U-shaped portion 20 for engagement with the panel P. The latter portion is defined by and includes a pair of spaced, resilient legs 22 and 24 extending in the same general direction and slightly angularly inwardly toward one another from a curved bight section 26. The leg 24 is struck-out to provide a resilient tab 28 which projects upwardly and inwardly therefrom in the general direction of the bight section 26, and which is adapted for engagement within an aperture 30 provided in the panel adjacent the panel opening 4 (FIG. 3). Moreover, the angular relationship of the legs 22 and 24 combine to provide an effective clip-like arrangement to engageably retain various panels of various thickness, thereby to automatically compensate for tolerance variations or inaccuracies of the supporting member.

The other leg 22 of the U-shaped portion 20 is preferably bent upwardly and angularly inwardly to provide a yieldable arm 32 defining the connector engaging portion 18. The arm 32 is preferably struck-out entirely within its margins to provide a polygonal, such as rectangular shaped, window-like opening 34 adapted to slidably, yet snugly receive therethrough one of the flanged ends 12 and 14 of the connector C, thereby to prevent movement of the connector C relative to the panel. The free end of the arm 32 may be bent upwardly and inwardly to provide a flange 36 to facilitate attachment of its fastener to the connector C. In this form, the marginal side portions of the arm 32 may be bent downwardly and generally normal relative to the general plane of the arm 32 to provide depending flanges 38 and 40 which combine with the flange 36 to strengthen and rigidify the arm 32 in its assembled relationship with the connector.

In assembly, a pair of the fasteners 2 may be attached to the panel P simply by snapping the U-shaped portions 20 over the marginal portions adjacent the panel opening 4. The connector C may then be inserted through the opening 4 so that the flanged ends 12 and 14 thereof are disposed through the window-like opening 34 provided in the yieldable arm 32 of each of the respective fasteners. Thus assembled, the resilient tabs 28 of the legs 24 are disposed in coacting engagement within the apertures 30 provided adjacent the panel opening 4, thereby to prevent any movement of the fasteners relative to the panel, and hence, to prevent any movement of the connector relative to the panel in the assembled position of the fasteners with the panel. Moreover, it can be seen that in the assembled position, the angular disposition and window-like construction of the yieldable arm 32 effectively combine to provide a uniform gripping action against the confronting exterior surfaces of the flanged ends 12 and 14 of the connector which not only prevents any lateral shifting movement thereof, but also prevents any axial movement of the connector in the installed position with the panel.

In FIGS. 4 and 5 there is illustrated a modification of the fastener device, designated generally at 2A, which is generally similar in application to that illustrated in FIGS. 1 and 2 for mounting a connector CA through an opening 42 provided in a support member PA, such as a panel. In this form, however, the strip of material is formed to provide a substantially planar leg 44 adapted for engagement adjacent the confronting undersurface of the panel adjacent the panel opening 42. The leg 44 is bent along the bend line 46 to provide a yieldable arm 48 which projects upwardly and angularly outwardly from the general plane of the leg 44. In the embodiment shown, the arm 48 is preferably struck-out adjacent one end and entirely within its margins to provide a resilient tongue 50 which is spaced laterally from and which extends in the same general direction as the leg 44 to define therewith a generally U-shaped clip arrangement for attachment to the panel.

The arm 48 is also preferably struck-out adjacent its other end to provide a resilient finger 52 which projects outwardly and downwardly from the general plane of the arm 48 for engagement with the upper surface of one of the flanged ends 54 of the connector. The struck-out tongue 50 and finger 52 construction together define a generally polygonal, such as rectangular shaped, window-like opening 56 adapted to slidably, yet snugly receive therethrough one of the flanged ends 54 of the connector upon assembly with the fastener, as aforesaid. Here again, the free end of the arm 48 may be bent to provide an upwardly and angularly extending flange 58 to facilitate attachment to the connector and to rigidify the fastener in that area upon assembly with the connector. The material of the leg 44 may be depressed to provide a generally peripherally-continuous projection 60 which extends upwardly from the general plane of the leg 44 and which is adapted for coacting engagement within an aperture 62 provided in the panel adjacent the panel opening 42, thereby to prevent movement of the fastener in its assembled position with the panel.

The assembly in this form is achieved in a similar manner to that illustrated in FIGS. 1 to 3, by first securing a pair of the fasteners 2A to the marginal portions of the panel PA adjacent the opening 42 therein. Thus, assembled the marginal portions of the panel are clamped between the leg 44 and tongue 50 of each of the respective fasteners so that the projection 60 on each of the tongues is disposed for coacting engagement within the aperture, such as 62, provided in the panel on opposite sides of the opening 42 therein. The flanged ends, such as the end 54, of the connector may then be inserted through the window-like opening 56 in the yieldable arm 48 of the respective fastener. Upon insertion, the resilient finger 52 snaps into engagement against the confronting upper surface of the flanged end. Thus inserted, the flanged ends of the connector are automatically clamped between the tongue 50 and finger 52, thereby to prevent movement of the connector relative to the panel in the installed position of the fasteners.

In FIGS. 6, 7 and 7A there is illustrated another modification of the fastening device, designated generally at 2B, which is generally similar in application to that shown in FIGS. 4 and 5 for mounting a connector CB to an opening 64 in a support member PB, such as a panel. In this form, the strip of material is formed to provide a generally flat base 66. The material of the base 66 is preferably struck-out centrally thereof to provide a resilient tongue 68 which extends outwardly from and generally normal to the base. Hence, by the tongue 68 being struck-out, there is provided a polygonal, such as rectangular shaped, window-like opening 70 adapted to slidably, yet snugly receive therethrough a flanged end 72 of the connector CB, as aforesaid. The tongue 68 is preferably struck-out to provide a tab 74 which is adapted to be engageably disposed within an aperture 76 provided in the panel adjacent the panel opening 64 to prevent movement of the fastener relative to the panel.

As shown in this form, the base 66 is preferably bent adjacent its upper end to provide a curved flange 78 which extends outwardly and angularly downwardly in the general direction of the tongue 68 for engagement against the confronting upper surface of the flanged end 72 of the connector. The flange 78 may be provided with a resilient finger 80 extending in the same general direction thereof and having a substantially reduced transverse dimension compared to the transverse dimension of the flange 78 itself so that the finger 80 may readily be disposed for coacting engagement within a generally vertically extending opening 82 provided in the flanged end 72, thereby to prevent movement of the connector relative to the panel in the installed position of the fastener. The base 66 is preferably bent adjacent its other or lower end along the bend line 84 to provide a downwardly and angularly inwardly extending portion 86 which is struck-out to provide another tab 88 which extends outwardly and angularly upwardly in the general direction of the tongue 68 for engagement against the lower or undersurface of the panel adjacent the panel opening 64. Hence, in the assembled position, the tab 74 of the tongue 68 combines with the tab 88 of the portion 86 to prevent movement, and particularly any lateral shifting movement of the fastener relative to the panel.

In assembly of this form, however, a pair of the fasteners 2B may be attached first to the connector CB simply by inserting the flanged ends, such as end 72, through the window-like opening 70 provided in the base 66 of the respective fasteners. Upon insertion, the resilient fingers 80 of the associated one of the fasteners snaps into engagement within the opening 82 provided in the flanged end 72 of the connector. The connector and depending fasteners may then be inserted, as a unit, through the opening 64 in the panel so that tab 74 of the tongue 68 is disposed within the aperture 76 of the panel and the tab 88 of the portion 86 is snapped into engagement against the confronting underside of the panel adjacent the opening 64, thereby to prevent movement of the connector relative to the panel in the installed position of the fasteners.

Figure 9:
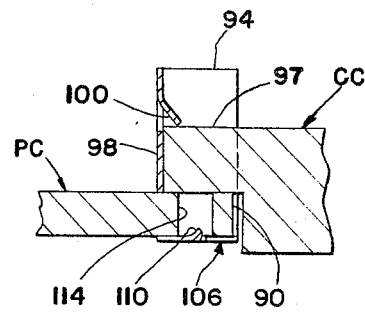
FIG. 9 is a sectional view showing one end of an article, such as an electrical connector, mounted through an opening in a support member by means of the fastening device shown in FIG. 8.

In FIGS. 8 and 9 there is illustrated another modification of the fastening device, designated generally at 2C, which is generally similar in application to that shown in FIGS. 6 and 7 for mounting a connector CC through an opening 90 in a support member PC, such as a panel. In this form, however, the strip of material may be formed so as to provide what may be termed a box-like construction comprising a generally U-shaped body 92 which is preferably open at one end and along one side thereof. The body 92 includes and is defined by a pair of spaced, side walls 94 and 96 which extend outwardly and generally normal to an end wall 98. The side walls 94 and 96 are preferably spaced apart a distance sufficient to slidably, yet snugly receive in locking engagement therebetween a flanged end 97 of the connector in assembled position with the fastener. The end wall 98 may be struck-out adjacent its upper end thereof to provide a resilient tongue 100 which extends downwardly and angularly inwardly therefrom for engagement with the top or upper surface of the flanged end 97, thereby to lock the connector against vertical movement when assembled with the panel.

The end 98 and side walls 94 and 96 are conjointly cut out, as at 104 to provide a generally L-shaped resilient arm 106 which extends outwardly and generally transversely relative to the end wall 98 to provide a clip-like device for attachment to the marginal portions of the panel adjacent the panel opening 90. The arm 106 may be split transversely across its width, as at 108, and struck-out to provide a pair of oppositely disposed, generally polygonal, such as triangular shaped, projections 110 and 112 which extend upwardly therefrom for coacting engagement within an aperture 114 provided in the panel adjacent the panel opening 90 to prevent movement of the fastener, particularly lateral shifting movement thereof relative to the panel.

In assembly, a pair of the fasteners 2C may be attached to the panel PC simply by snapping the resilient L-shaped arm 106 of the associated fastener into engagement with the marginal portions of the panel adjacent the opening 90 therein. Thus attached, the projections 110 and 112 of the arm are disposed for engagement within an aperture 114 provided in the panel to prevent movement of the fastener in the installed position on the panel. The connector CC may then be attached to the mounted fasteners by inserting the flanged ends, such as end 97, down through the U-shaped body 92 of each of the fasteners so that the flanged end is engageably retained by the end 98 and side walls 94 and 96 thereof. Upon insertion of the resilient tongue 100 snaps into engagement against the confronting upper surface of the flanged end, thereby to prevent movement of the connector relative to the panel in the installed position of the fastener.

Figure 10:
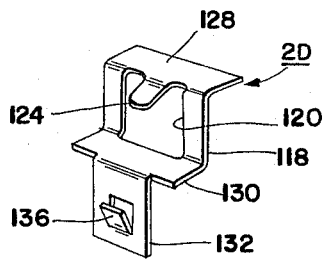
FIG. 10 is a perspective view of another modification of the fastening device made in accordance with the present invention.
Figure 11:
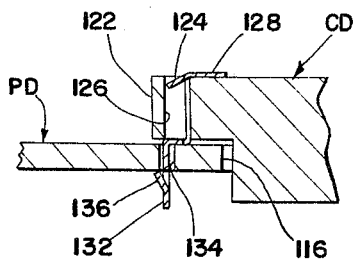
FIG. 11 is a sectional view showing one end of an article, such as an electrical connector, mounted through an opening in a support member by means of one of the fastening devices as shown in FIG. 10.

In FIGS. 10 and 11 there is illustrated another modification of the fastening device, designated generally at 2D, which is generally similar in application to that shown in FIGS. 6 and 7 for mounting a connector DC through an opening 116 provided in a similar type panel PD. In this form, however, the strip of material may be formed to provide what may be termed a double-stepped construction comprising a generally flat base 118 which is struck-out centrally thereof to provide within its margins a window-like opening 120 adapted to receive a flanged end 122 of the connector CD upon assembly with the fastener. The opening 120 is so struck-out as to provide a resilient finger 124 which projects outwardly and angularly downwardly from the general plane of the base 118 for engagement within a generally vertically extending opening 126 provided in the flanged end 122 of the connector, thereby to combine with the window construction 120 to prevent any movement of the connector in the assembled position with the fastener. The base 118 may be bent adjacent its upper end to provide a flange 128 which projects outwardly and generally normal to the base for engagement against the top or upper surface of the flanged end 122 upon assembly of the connector with the fastener.

In this form, the other end of the base 118 is preferably bent to provide another flange 130 which projects outwardly and normal to the base and on the opposite side relative to the flange 128 to define a shoulder-like construction for engagement with the top or upper surface of the panel adjacent the panel opening 116. The free end of the flange 130 may be bent downwardly to provide a generally vertically extending leg 132 having a substantially reduced transverse dimension compared to the transverse dimension of the flange 130 and which is adapted to be inserted through an aperture 134 provided in the panel adjacent the panel opening 116. The material of the leg 132 may be struck-out to provide a tab 136 which projects outwardly and upwardly therefrom for engagement against the bottom or undersurface of the panel adjacent the aperture 134, thereby to lock the fastener in snap-fastened engagement with the panel.

In assembly, a pair of the fasteners 2D are attached to the connector CD simply by inserting the flanged ends, such as end 122, of the connector through the window-like opening 120 provided in the base 118 of the associated fastener. Upon insertion, the resilient finger 124 snaps into engagement within the opening 126 provided in the flanged end to prevent movement of the fastener relative to the connector. The connector and depending fasteners may then be inserted, as a unit, through the opening 116 in the panel. Upon insertion of the connector, the leg 132 of the associated fastener is disposed through the aperture 134 in the panel so that the tab 136 snaps into engagement against the confronting underside of the panel. Thus inserted, the panel is clamped between the flange 130 and the tab 136 of the associated fastener, thereby to prevent movement of the connector relative to the panel in the installed positions of the fasteners.

While this invention has been described in detail with specific examples, such examples are illustrative only since it will be apparent to those skilled in the art that other modifications within the spirit and scope of the invention may be constructed without departing from the teachings of essential characteristics thereof. The present embodiments are therefore to be considered in all respects as illustrative and not restrictive, the scope of the invention being indicated by the appended claims rather than the foregoing description.

I claim:

1. A fastening device for securing an article to a support member having an opening therein comprising, a generally U-shaped support member attachment means, said attachment means including a pair of spaced resilient legs extending generally in the same direction from a bight portion for clamping engagement with a support member, the free end of one of said legs being bent to provide a resilient arm which extends obliquely upwardly from the general plane of said legs in the general direction toward said bight portion, said arm having a polygonal shaped window-like opening struck out within its margin to retain a portion of an article inserted therethrough, and the other of said legs including a retainer means projecting upwardly therefrom for holding engagement within an aperture in a support member in the assembled position thereof.

2. A fastening device in accordance with claim 1, including a flange extending outwardly from the general plane of said arm adjacent its free end thereof, and a pair of oppositely disposed flanges extending outwardly from the general plane of said arm and on the opposite side from said first mentioned flange to strengthen said arm immediately adjacent the margin of said window-like opening therein.

3. A fastening device in accordance with claim 1, wherein said legs are disposed in a slightly convergent relationship extending in a direction away from said bight portion for yieldable clamping engagement with a support member.

4. A unitary sheet metal fastening device for securing an electrical component to a support member having an opening therein, said device comprising upper and lower resilient legs, said legs being spaced apart and extending in the same general direction from a bight portion which joins the legs together at one end to provide a generally U-shaped configuration to engageably retain a portion of an electrical component in the assembled position thereof, said upper leg being bent to provide a resilient arm which extends obliquely upwardly from the general plane of said leg and which extends in the general direction and toward said bight portion, said arm having a generally polygonal shaped window-like opening struck out entirely within its margins to slidably receive therethrough and engageably retain therein a portion of an electrical component in the assembled position thereof, and the other of said legs including a resilient tab portion projecting angularly upwardly therefrom in the general direction toward said bight portion for engagement within an aperture provided in a support member to prevent shifting movement of said device relative to a support member.

5. A fastening device in accordance with claim 4, including a flange extending outwardly from the general plane of said arm adjacent its free end thereof, and a pair of oppositely disposed flanges extending outwardly from the general plane of said arm and on the opposite sides thereof to rigidify the arm immediately adjacent the margins of said window-like opening.

6. A fastener device according to claim 1, wherein said retainer means comprises a resilient tab extending outwardly and angularly inwardly from the general plane of said leg in the general direction of said bight portion for engagement within an aperture provided in a support member adjacent the opening therein.

7. A unitary, sheet metal fastening device for securing an article to a support member having an opening therein, said fastening device comprising upper and lower resilient legs, said legs being spaced apart and extending in the same general direction from a bight portion which joins the legs together at one end to provide a generally U-shaped configuration to engageably retain therebetween a portion of a support member adjacent an opening, said upper leg being bent to provide a resilient arm which extends generally obliquely upwardly from the general plane of said leg and which extends in the general direction toward said bight portion, and said resilient arm having a generally polygonal shaped window-like opening struck-out entirely within its margins to slidably receive therethrough and engageably retain therein a portion of an article in the assembled position on a support member.

References Cited by the Examiner
UNITED STATES PATENTS

| | | | |
|---|---|---|---|
| 2,171,350 | 8/1939 | Anderson | 40—324 |
| 2,547,531 | 4/1951 | Melvin et al. | 24—259 |
| 2,605,624 | 8/1952 | Halladay | 248—37.6 |
| 2,665,103 | 1/1954 | Flora et al. | 248—314 |
| 2,685,720 | 8/1954 | Petri | 24—73 |
| 2,703,662 | 3/1955 | Meyer | 220—3.6 |
| 2,770,435 | 11/1956 | Becker | 248—27 |
| 2,775,010 | 12/1956 | Bedford | 24—73 |
| 3,027,538 | 3/1962 | Deakin | 339—195 |
| 3,101,922 | 8/1963 | Moody | 248—27 |

CLAUDE A. LE ROY, *Primary Examiner.*

W. D. LOULAN, *Assistant Examiner.*